(12) United States Patent
Zimmerman et al.

(10) Patent No.: US 9,848,280 B2
(45) Date of Patent: Dec. 19, 2017

(54) WIRELESS SENSOR MODULE

(71) Applicant: Civionics, Inc, Ann Arbor, MI (US)

(72) Inventors: Andrew T. Zimmerman, Colorado Spring, CO (US); Gerald P. Roston, Saline, MI (US)

(73) Assignee: Civionics, Inc., Ann Arbor, MI (US)

( * ) Notice: Subject to any disclaimer, the term of this patent is extended or adjusted under 35 U.S.C. 154(b) by 222 days.

(21) Appl. No.: 14/938,198

(22) Filed: Nov. 11, 2015

(65) Prior Publication Data

US 2017/0070843 A1 Mar. 9, 2017

Related U.S. Application Data

(60) Provisional application No. 62/213,836, filed on Sep. 3, 2015.

(51) Int. Cl.
*G08C 17/00* (2006.01)
*H04W 4/00* (2009.01)
*H04W 52/02* (2009.01)

(52) U.S. Cl.
CPC ....... *H04W 4/005* (2013.01); *H04W 52/0251* (2013.01); *Y02B 60/50* (2013.01)

(58) Field of Classification Search
None
See application file for complete search history.

(56) References Cited

U.S. PATENT DOCUMENTS

| | | | |
|---|---|---|---|
| 6,421,354 B1 | 7/2002 | Godlewski | |
| 7,154,398 B2 | 12/2006 | Chen et al. | |
| 7,457,834 B2 | 11/2008 | Jung et al. | |
| 7,720,993 B2 | 5/2010 | Liu et al. | |
| 7,941,188 B2 | 5/2011 | Jung et al. | |
| 8,013,732 B2 | 9/2011 | Petite et al. | |
| 8,410,931 B2 | 4/2013 | Petite et al. | |
| 8,666,357 B2 | 3/2014 | Petite | |
| 8,667,091 B2 | 3/2014 | Almadi et al. | |
| 8,930,571 B2 | 1/2015 | Petite | |

(Continued)

OTHER PUBLICATIONS

International Search Report and Written Opinion for PCT/US16/50300 dated Dec. 2, 2016.

*Primary Examiner* — Otis L Thompson, Jr.
(74) *Attorney, Agent, or Firm* — Endurance Law Group PLC

(57) ABSTRACT

A wireless sensor module can include a primary body, a primary processor, a first plurality of sockets, a secondary body, a secondary processor, a first transducer, and a wireless transceiver. The primary processor and the sockets can be mounted to the primary body. The secondary body can be releasibly mounted to the primary body and the secondary processor can be mounted to the secondary body. The primary processor and the secondary processor can be in electrical communication with one another, operating asynchronously. The primary processor can direct electrical signals generated by the first transducer to the secondary processor. The secondary processor can process the electrical signals independently of the primary processor and selectively communicate output to the primary processor. The primary processor can be configured to control communications through the wireless transceiver independently of the secondary processor.

20 Claims, 3 Drawing Sheets

(56) References Cited

U.S. PATENT DOCUMENTS

| | | |
|---|---|---|
| 9,031,824 B2 | 5/2015 | Nasle |
| 2001/0024165 A1 | 9/2001 | Steen, III et al. |
| 2003/0174070 A1 | 9/2003 | Garrod et al. |
| 2004/0084359 A1 | 5/2004 | Pasko |
| 2004/0130446 A1 | 7/2004 | Chen et al. |
| 2005/0210340 A1 | 9/2005 | Townsend et al. |
| 2006/0077607 A1 | 4/2006 | Henricks et al. |
| 2007/0153723 A1 | 7/2007 | Souissi et al. |
| 2009/0058663 A1 | 3/2009 | Joshi et al. |
| 2010/0026518 A1 | 2/2010 | Kirst et al. |
| 2010/0177750 A1 | 7/2010 | Essinger et al. |
| 2012/0213136 A1 | 8/2012 | Woo et al. |
| 2014/0297219 A1 | 10/2014 | Zhang et al. |
| 2014/0375274 A1 | 12/2014 | Tsai et al. |
| 2015/0306392 A1* | 10/2015 | Sabesan ............... A61B 5/0205 607/45 |
| 2016/0192040 A1* | 6/2016 | Suresh .................... H04Q 9/00 340/870.07 |

* cited by examiner

WIRELESS SENSOR MODULE

CROSS-REFERENCE TO RELATED APPLICATIONS

This application claims the benefit of U.S. Provisional Patent Application Ser. No. 62/213,836 for SYSTEMS AND METHODS FOR PROCESSING REAL-TIME SENSOR DATA, filed on 3 Sep. 2015, which is hereby incorporated by reference in its entirety.

BACKGROUND

1. Field

The present invention relates to processing real-time transducer data for the purpose of reducing the amount of information to be transmitted.

2. Description of Related Prior Art

The advent of highly capable microcontrollers, high energy density batteries, and ubiquitous cloud-computing has spawned a new age—the age of the Internet of Things (IoT). One application for IoT is the monitoring of various systems, from people to machines. A typical scenario involves outfitting the object to be monitored with sensors and having these sensors communicate, typically wirelessly, either directly to the cloud or via a gateway to the cloud. Once the data are in the cloud, various computational processes can be applied to the data to provide information to users.

As valuable as this new paradigm is, there are significant shortcomings with existing products and technologies that address the markets' needs.

What is needed is a low cost, extensible, sensing system that accommodates low power stream processing modules that can operate on real-time transducer data and extract information from it.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A wireless sensor module can include a primary body, a primary processor, a first plurality of sockets, a secondary body, a secondary processor, a first transducer, and a wireless transceiver. The primary processor can be mounted to the primary body. The first plurality of sockets can be mounted to the primary body and can be disposed in electrical communication with the primary processor. The secondary body can be releasibly mounted to the primary body through a first socket of the first plurality of sockets. The secondary processor can be mounted to the secondary body. The primary processor and the secondary processor can be disposed in electrical communication with one another through the first socket and can be operating asynchronously. The first transducer can be releasibly mounted to the primary body and can be disposed in electrical communication with the primary processor through a second socket of the first plurality of sockets. The primary processor can be configured to direct the electrical signals generated by the first transducer to the secondary processor. The wireless transceiver can be disposed in electrical communication with and controlled by the primary processor. The secondary processor can be configured to process the electrical signals generated by the first transducer independently of the primary processor and selectively communicate output to the primary processor. The primary processor can be configured to control communications through the wireless transceiver independently of the secondary processor.

BRIEF DESCRIPTION OF THE DRAWINGS

The detailed description set forth below references the following drawings.

DETAILED DESCRIPTION

Figure 1:
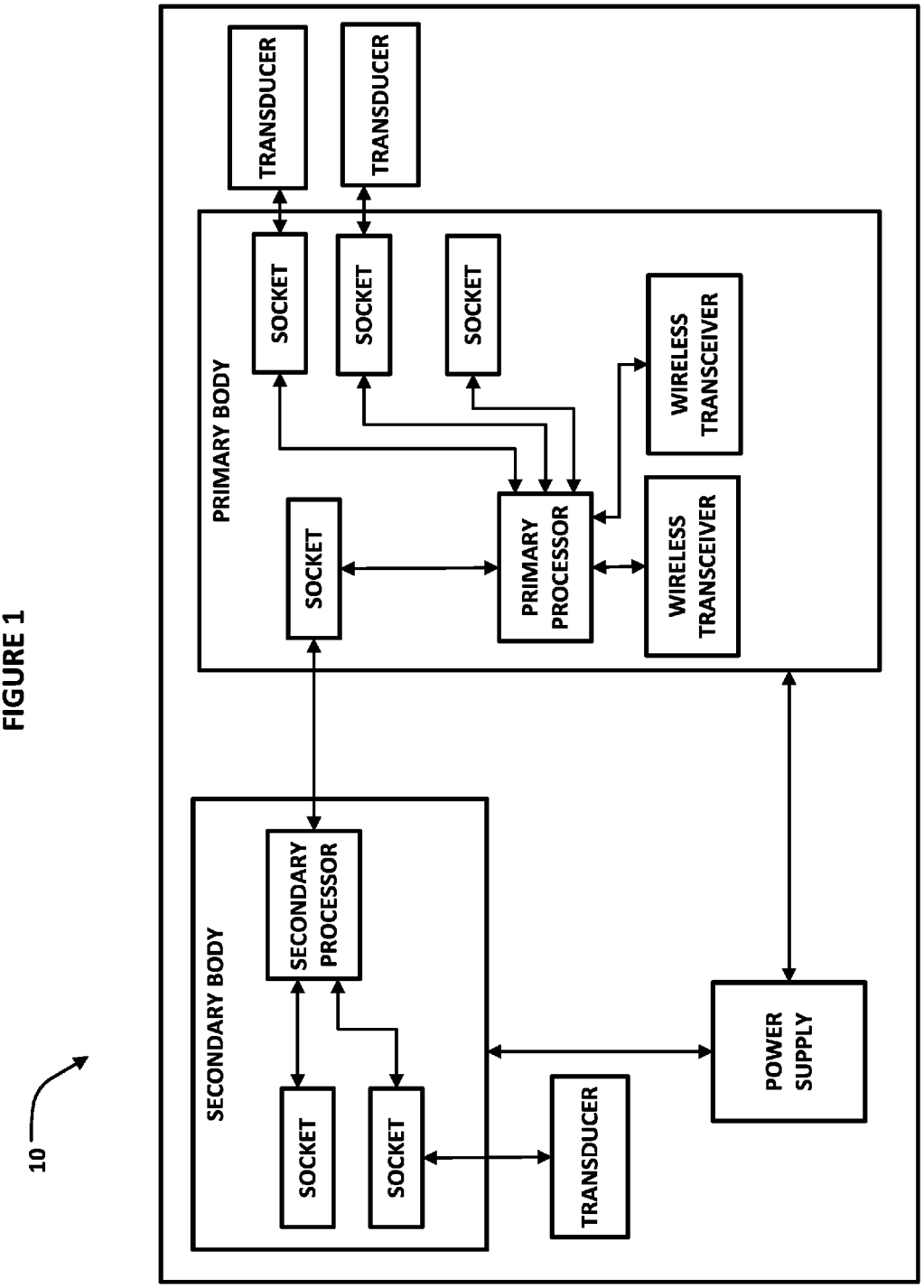
FIG. 1 is a schematic of a wireless sensor module according to an exemplary embodiment of the present disclosure.

The following description is merely exemplary in nature and is not intended to limit the present disclosure, application, or uses. It should also be understood that throughout the reference numerals indicate like or corresponding parts and features. In respect of the methods disclosed, the order of the steps presented is exemplary in nature, and thus, is not necessary or critical, unless otherwise noted. In addition, while much of the present invention is illustrated using specific examples, the present invention is not limited to these embodiments. All publications, patent applications, patents, and other references mentioned herein are incorporated by reference in their entireties. In case of conflict, the present specification, including definitions, will control.

The following definitions apply to certain terms used in the specification:

Cloud (and similarly cloud-based computing, cloud computing, etc.): A network of computers that is generally accessible to computers not comprising the cloud.

Computer: Any electronic computing device. Example span the gamut from single chip, 8-bit microcontrollers to 1000-plus node super computers.

Socket: An interface that provides both mechanical and electrical connectivity between two bodies.

Releasibly mounted: A means of coupling two bodies together via a socket that can be operated without the need for specialized assistive tooling.

Process: The act, by a computer, of performing algorithmic functions.

Stream process: A type of processing wherein at least one input to the algorithm is a flow of transducer data being acquired in real-time.

Transducer: A device which converts a first physical quantity into a second physical quantity. Examples of first physical quantities include temperature (thermometer), vibration (accelerometer), varying air pressure (microphone), photonic patterns (video camera), molecular detectors ($CO_2$ sensor), etc. Typically, the second physical quantity is electricity with specified conditions that are easily interpreted by a computer.

Transducer data: For clarity, there are two stages of transducer data: raw transducer data is the output from a transducer; interpreted transducer data is the result of digitizing raw transducer data by a computer.

The inventors have perceived that one problem associated with the monitoring systems relates to the lack of an integrated architecture. There exists a popular class of devices that fall under the Arduino label. These are small, low-cost single board computers to which a variety of peripherals can be attached. The problem with these devices is that the user has to develop the entire system from the ground up—there are no systems in place placed on this architecture.

Other systems require a separate transducer interface box for each deployed transducer. Examples include the MicroStrain line of products from Lord. Most of their products, which typically cost $650 and up, support but a single transducer. Thus, to outfit a capital asset with multiple transducers is expensive and potentially challenging, due to the need to emplace multiple transducer interface boxes. Having multiple transducer interface boxes also means that multiple power sources are needed.

Many systems, such as the MicroStrain line of products, require a special device to serve as a gateway between the wireless transducer interface boxes and the cloud. The need for such a gateway further increases system cost as these gateways do not have the capability to interface with transducers directly.

While the above cited shortcomings make it difficult and/or expensive to deploy wireless sensing systems, the biggest drawback with all existing wireless sensing systems is that they lack on-board processing capabilities. What this means is that they are required to transmit raw data to the cloud. As an example, for the application of machinery health monitoring, if the manner in which the machine vibrates is the critical parameter being monitored, one typically outfits the machine with accelerometers and typically samples them at ten times the frequency of interest. To extract the frequency from the raw acceleration data, one typically needs thousands of samples, each typically two bytes in size. Since the actual frequency itself can typically be stored as a four byte value, if one were to perform the frequency extraction not in the node, the number of bytes that would need to be transmitted is several thousand times greater than just transmitting the frequency. Since there is overhead associated with the transmission of each byte, the energy required to transmit the raw data can be significant. To transmit these data to the cloud, when taking into account various overheads associated with creating intelligible data blocks, packet headers, etc., requires on the order of 3000+ bytes of data per second. However, the actual amount of information being transmitted is on the order of several bytes, i.e., about one percent of the amount of data transmitted.

This excessive data transmission has a significant impact on energy consumption. Specifically, the amount of energy needed to transmit the data is typically orders of magnitude greater than the amount of energy needed to perform the data analyses on-board to extract the required information. For small, low-cost wireless systems, where only limited battery energy is available, the extra energy needed to transmit the data can make an application untenable due to the need to regularly replace the battery.

Another drawback to systems that lack on-board processing is that they necessarily transmit each data point that it gathered. However, if the physical process being measured does not change, no new information is delivered by repeatedly transmitting the same data value. Other than a periodic transmission to let the cloud know that a sensor is still functional, energy can be conserved by only transmitting a data point when its value changes. This means of intelligent data management is easily handled by an on-board processor.

This excessive data transmission also has a significant impact on data storage. Specifically, by transmitting raw data, as opposed to processing the data and transmitting just the information contained within said data, one requires orders of magnitude more storage capacity than actually needed. This leads to data glut, higher costs, slower data retrieval times, and other similar problems.

FIG. 1 is a schematic of a wireless sensor module 10 according to an exemplary embodiment of the present disclosure. The wireless sensor module 10 can include a subset of functional modules. The wireless sensor module 10 can provide one or more interfaces to optional modules, thereby enhancing the flexibility of the system while providing the means of minimizing cost.

For example, one such set of optional modules are transducer interface modules. Said modules run the gamut from very simple to very complex. For example, a simple module may comprise a voltage divider network for interfacing with a thermistor. For example, a sophisticated module may comprise a dedicated microcontroller for managing a camera. It is typically the case that the module presents a common interface to the processor in order to allow application developer to easily acquire transducer data from all modules.

An aspect of the wireless sensor module 10 is that a plurality of wireless sensor modules 10 may form a mesh network. Having the wireless sensor modules 10 form a mesh network provides several important benefits: only a subset of them needs to have the ability to communicate with the cloud; computing resources can be shared; and patterns can be more sophisticated. These benefits lead to both reduced cost and increased robustness as redundancy can be easily incorporated into the system design.

An aspect of the architecture of the wireless sensor module 10 is the separation of processing capability between a primary processor and a secondary processor. For example, the secondary processor can be a stream processing module. One might configure a wireless sensor module 10 in this manner since managing a real time sensor node requires precise timing control between various events, especially in those embodiments that include a mesh network, because coordination between the nodes requires that they transmit/receive at known times. Thus, requiring the primary processor, which typically manages these timed events, to also stream process sensor data is challenging as the additional code has to work within the confines of the rigidly imposed timing constraints.

The means of communication between the primary processor and the secondary processor can be a standard digital interface, such as SPI or I²C, which means that the two processors are loosely coupled. In an embodiment, the primary processor can direct the secondary processor to act on a block of data and when the processing is done, the secondary processor can interrupt the primary processor to let it know that the results are ready. Since transducer interface modules typically operate in a similar manner, the secondary processor can appear to the primary processor as simply another sensor, thereby greatly simplifying the task of managing the data outputted by the secondary processor.

More specifically, the secondary processor can be connected to the primary processor via at least one commonly available digital interface (USART, SPI, I²C, etc). Buffered direct memory access (DMA) on both processors can be used to abstract inter-processor communications from the primary processor to minimize interruption of core system functionality for the sake of communication. In general, the secondary processor can be a slave to the primary processor and all communication between processors will be initiated by the primary processor. However, the architecture can be configured to allow communications to be initiated by the secondary processor as well. In certain embodiments, an overarching system objective is minimizing energy consumption and in such cases it is desirable to have both processors sleep as deeply as possible as often as possible; and as such it is not desirable to have communications channels open all of the time. As a result, a single IO line can be exposed that allows the primary processor to wake up the secondary processor from a deep sleep via an asynchronous interrupt. A second I/O line could be used in the opposite direction in some cases where it is advantageous for the secondary processor to have the ability to wake up the primary processor (e.g. if the secondary processor is performing autonomous tasks and detects a problem with the monitored system that demands immediate attention).

The primary processor to secondary processor relationship can be defined in multiple manners. For example, in one manner, the secondary processor can begin its life in a sleep state, and only wakes up to perform a task when the primary processor deems it necessary. Results of this task are then buffered and communicated back to the primary processor when requested. In another manner, the secondary processor is configured by the user to wake itself up periodically to perform a task and buffer the processed results. These results are then periodically communicated back to the primary processor when requested.

From a data processing perspective, there are multiple distinct architectures that can be considered. For example, in one architecture, the primary processor handles the data acquisition tasks, with transducer data being provided to the primary processor from transducers that are releasibly connected to transducer modules that are releasibly connected to the primary body, and passes collected sensor data to the secondary processor for processing. In another architecture, the secondary processor performs its data acquisition tasks independently from the primary processor, and processes this data after it is collected independently of the primary processor. Results are communicated back to the primary processor upon request.

In addition to receiving sensor data from the primary processor, or equivalently, a pointer to one or more blocks of sensor data, a secondary processor may also include transducer interface functionality, thereby allowing it to directly interrogate sensors. In such cases, the secondary processor may perform data acquisition tasks with transducer data being provided to the secondary processor from transducers that are releasibly connected to sockets affixed to the secondary body, The secondary processor may operate on either data provided by the primary processor, data it acquires itself, or any combination thereof.

In certain embodiments, the secondary processor may stream process real-time transducer data. For example, the second processor may be provided a real-time stream of transducer data, such as acceleration data from a three-axis accelerometer at 200 (or more) samples per second, and may perform calculations, such as a Fast Fourier algorithm, on said data stream to reduce the 200 (or more) samples per second to a single value, e.g., the dominant frequency.

The output of the secondary processor can be a numerical value. The primary processor can be configured to selectively transmit the output of the secondary processor through a wireless transceiver only in response the numerical value changing a predetermined amount. For example, if the secondary processor is monitoring a physical process and a numerical value associated with the physical process being measured does not change, no new information need be delivered to avoid repeatedly transmitting the same data value. Other than a periodic transmission to let the cloud know that a sensor is still functional, energy can be conserved by only transmitting a data point when its value changes so predetermined amount. This means of intelligent data management is easily handled by an on-board processor.

In certain embodiments, the secondary processor may directly communicate with the one or more radios found in the wireless sensor module 10. FIG. 1 shows a first transceiver mounted on the primary body and a second transceiver mounted on the primary body. In one or more embodiments of the present disclosure, the primary processor can control the first transceiver exclusively and also be operable to selectively control the second transceiver. The secondary processor can be operable to selectively control the second transceiver.

Another aspect of the wireless sensor module 10 is that each one need not contain the same suite of transducers, have the same number of radios, or perform the same computational tasks as others in the same mesh network. This aspect further provides for reducing overall system cost.

Figure 2:
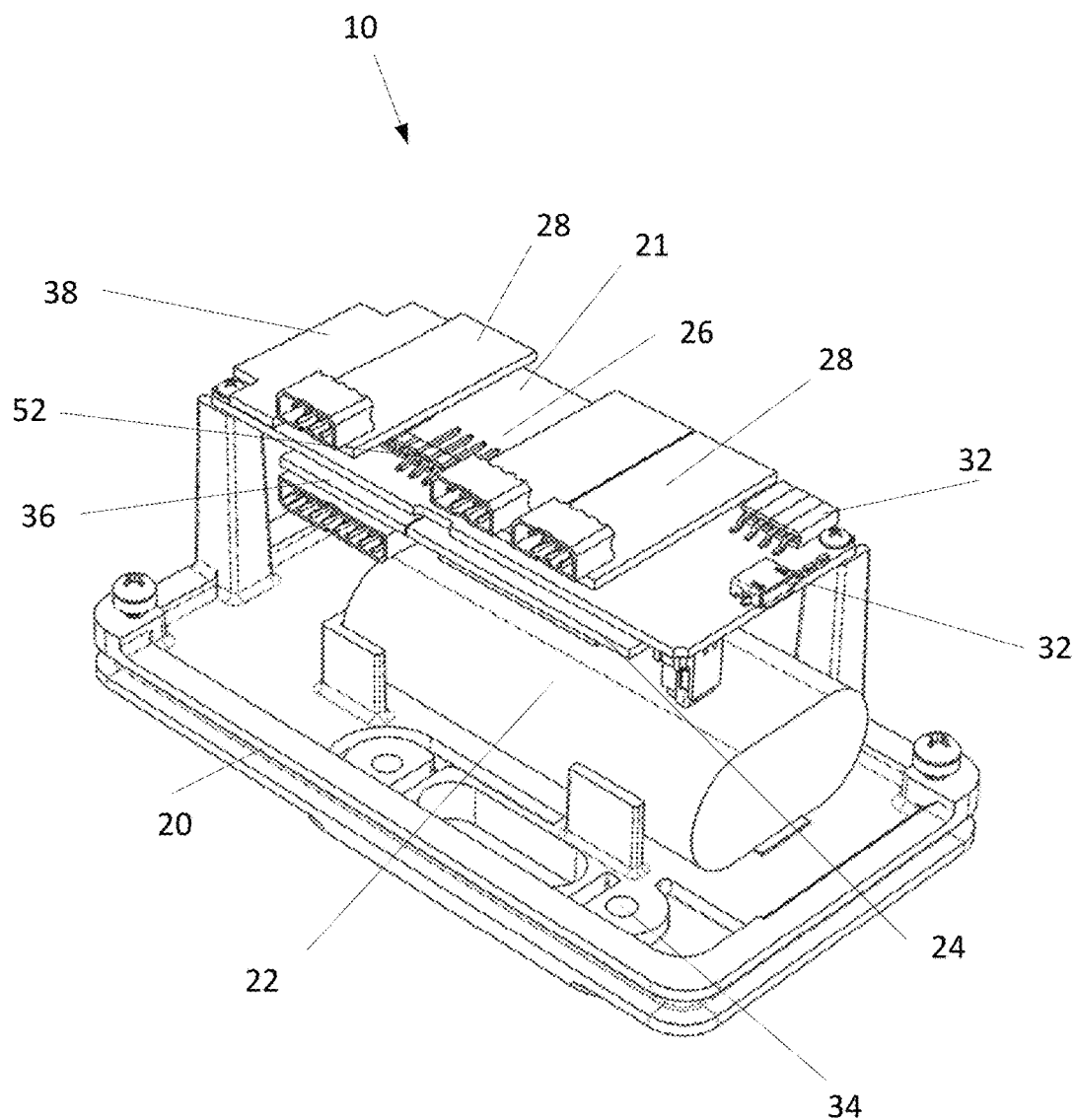
FIG. 2 is a perspective view of a wireless sensor module according to an exemplary embodiment of the present disclosure.

FIG. 2 is a perspective view of an exemplary wireless sensor module 10. A primary body 21 may be packaged within an enclosure 20 (cover omitted to reveal the internal structures of the wireless sensor module 10) that may also enclose optional batteries, such as battery 22. The exemplary primary body 21 is a circuit board. Features 34 can be defined on the enclosure 20 for affixing the enclosure 20 to the operating environment. The wireless sensor module 10 can include a first wireless transceiver module 38 having a radio and configured for forming a mesh network. The wireless sensor module 10 can also include power conditioning circuitry and other components as desired. In one or more embodiments, the electronics can be structured using a modular method. A plurality of sockets (referenced generally at 52) can be mounted on the primary body 21 for incorporating additional transducers. Transducer interface cards are referenced at 28 and are shown mounted to the primary body 21 of the wireless sensor module 10 for placing one or more transducers in electrical communication with the primary processor mounted on the primary body 21. A secondary processor can be mounted on a secondary body 36 that is connected to the primary body 21 via the socket 52. The secondary processor that is mounted on the secondary body 36 may optionally provide the means to serve as a transducer interface card. The computational engine that powers the secondary processor may be of the same or different family or type as the processor that powers the primary processor mounted on the primary body 21.

Any computing hardware can be used for the primary and secondary processors. Preferred hardware are those processors that are compact in size, offer integrated I/O capabilities, draw little power, and are low cost. An exemplary primary processor is an Atmel ATXMEGA128A3U, which provides 50 general purpose I/O lines, two analog-to-digital converters, one digital-to-analog converter, and several digital interfaces. These processors draw less than 15 mA when operating at full speed and less than 1 µA when in power-save mode. In moderate quantities, these processor cost less than $3.00 apiece. For cases in which the secondary processor is performing general purpose computing, an exemplary secondary processor is an Atmel ATXMEGA128A3U. For cases in which the secondary processor is performing stream processing, an exemplary secondary processor is an Atmel ATUC128L3U, which provides 32 bit processing, fixed point DSP support, dual port SRAM, and other features to facilitate data processing. These processors draw approximately 15 mA when operating at full speed and less than 7 µA when in power-save mode. In moderate quantities, these processor cost less than $8.00 apiece.

In addition to operating on data received from the transducer interface cards 28, the primary processor and secondary processor may act on internally generated data. For example, either processor may monitor the battery 22 voltage and send a message when said voltage falls below a specified set point. Similarly, the primary processor and secondary processor may act on the strength of radio signals received by either the first wireless transceiver module 38 and/or the additional transceiver modules 24 and report these values to the systems' users.

The wireless sensor module 10 can also include a socket/connector 32 for programming and/or accepting external power. In an embodiment, multiple sockets 32 can be provided. Additional transceiver modules 24 may also be included within the wireless sensor module 10, possibly for communicating with the cloud.

The wireless sensor module 10 can also include an output-type transducer interface card, wherein said card is used to send a signal to an external device. Said output signals would typically be routed through one of the plurality of sockets 52. Secondary body 36 can also include an output-type transducer interface that is used to send a signal to an external device. The signal to an external device would typically be created via the processing done by the primary processor and/or the secondary processor.

In an embodiment, the wireless sensor module 10 can be powered from wall outlets that are supplied by the power grid. Since grid failures occur regularly, and since incidents of interest could occur during a power outage, in an embodiment, battery 22 can be used to provide backup power to the wireless sensor module 10. In other embodiments, battery 22 can be the sole source of power for the wireless sensor module 10. In other embodiments, battery 22 can be the sole source of power for some of the components of the wireless sensor module 10 and other sources of power can be used for the remaining components of the wireless sensor module 10.

The operating voltage of the battery 22 typically depends on the voltage needs of the processor(s) and transducer(s). In certain applications, typically AA size batteries can be used, either primary cells (alkaline) or secondary cells (NiMH). In other applications, a higher operating voltage may be desirable. In such cases, lithium ion batteries, such as Tenergy 18650 may be used. In certain cases for which minimizing the size of the enclosure 20 is desirable, coin cells, such as CR2022 may be used.

The size of the enclosure 20 is typically determined by the size and quantity of components housed there within. For the exemplary wireless sensor module 10 shown in FIG. 2, which houses a primary body 21, a secondary body 36, up to four transducer interface cards 28, an additional transceiver module 24, and a battery 22, in an environmentally protected manner, the approximate size of enclosure 20 is 12 cm×7 cm×5 cm. An enclosure with similar capacity for components, but that does not provide environmental protection and ruggedness has an approximate size of 10 cm×5 cm×4 cm. A enclosure with a primary body 21, up to two transducer interfaces cards 28, and a battery (coin-type) 22 designed for compactness has an approximate size of 4 cm×4 cm×2 cm.

A wireless sensor module 10 can be further configured to receive software updates via either the first wireless transceiver module 38 and/or an additional transceiver module 24. Upon receiving such a software update, the module would reprogram itself using said software update. This capability provides great utility as it allows users to fix problems and/or add new capabilities without having to physically access each deployed wireless sensor module 10.

Each wireless sensor module 10 can be identified by a globally unique identifier. Communications between a wireless sensor module 10 and the cloud may be encrypted. In an embodiment, said encryption makes use of public-key/private-key encoding and uses said globally unique identifier as the private key.

Figure 3:
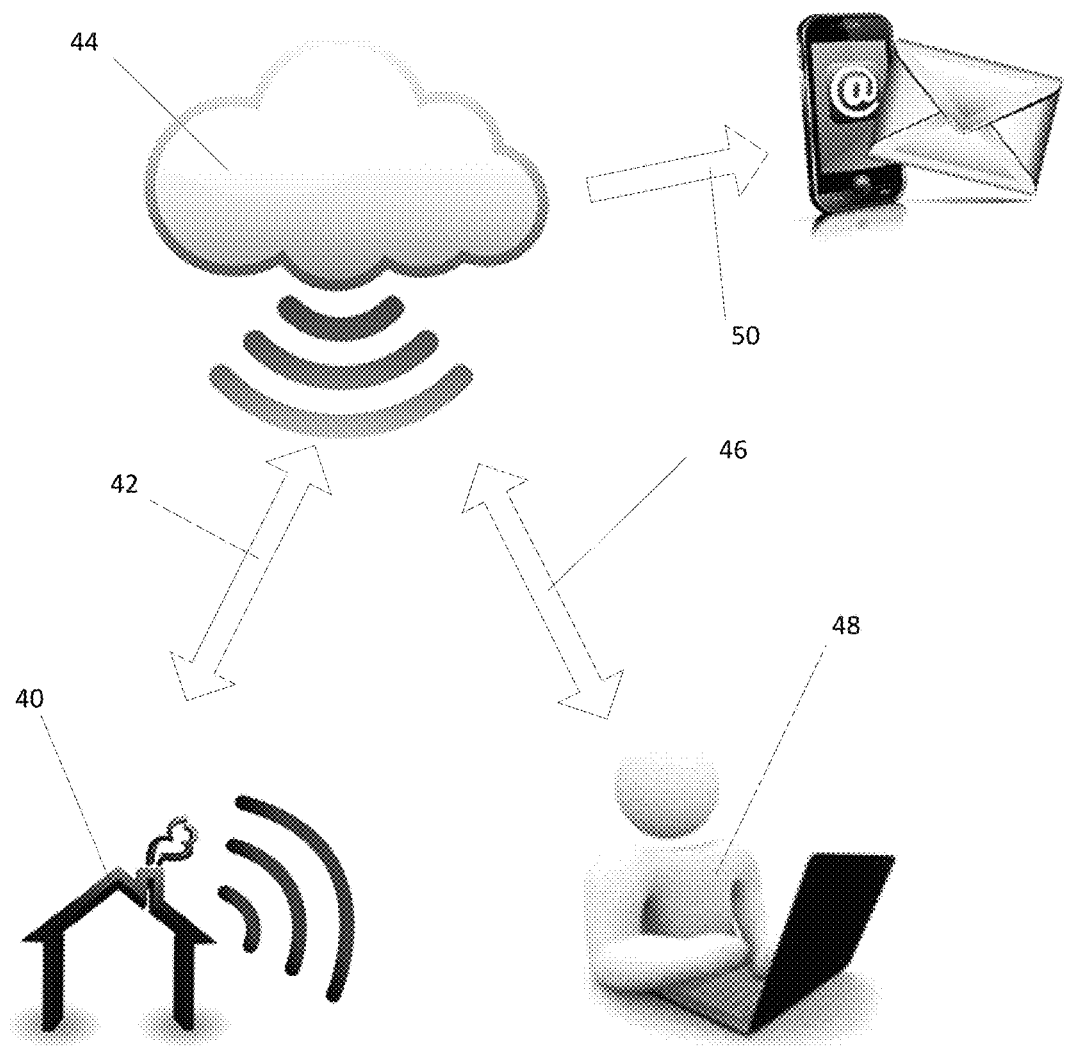
FIG. 3 is a schematic illustration of system incorporating a wireless sensor module according to an exemplary embodiment of the present disclosure.

FIG. 3 is a schematic illustration of system incorporating a wireless sensor module according to an exemplary embodiment of the present disclosure. The object (or person) being monitored is referenced at 40 and comprises an environment with a suite of emplaced wireless sensor modules 10. In an embodiment, a database record may be created that associates a unique identifier associated with each wireless sensor module 10 with the region of environment in which it is emplaced. Each wireless sensor module 10, or network of the same, can communicate with the cloud-based computers 44. The communication 42 may be wireless, using, for example, WiFi or packet radio; wired Ethernet, telephone lines, etc. The cloud-based computers 44 may perform several functions, including storing the data received from the instrumented environment 40, identifying patterns, accepting configuration information 46 from a user 48, and updating the operating parameters of the wireless sensor module 10 emplaced within instrumented environment 40.

When a condition or interest arises, the system may generate an alert 50. Information related to the alert condition may be sent to the user 48 using predetermined forms of communication, e.g., phone, SMS, email, etc.

The system described offers several key benefits that overcome the shortcomings with existing inventions and directly address the previously identified needs.

The system provides a complete architecture that allows users to deploy wireless sensor module 10 and to start receiving information without having to develop and hardware or software. Thus, the utility of the invention is high as it enabled those without significant technical expertise to benefit from the advantages of an IoT system.

The system disclosed is fully modular and allows the user to use a single wireless sensor module 10 to service multiple transducers. In an embodiment, up to 20 transducers can be serviced, but there is fundamental reason why a single wireless sensor module 10 could not service an untold number of transducers. The modularity reduces cost and improves flexibility of the system.

The modulatory of the disclosed system also allows for the easy addition of additional transceiver modules, which are typically used to communicate to the cloud. In an embodiment wherein each wireless sensor module 10 includes a radio for forming a mesh network, one or more of said wireless sensor module 10 may include an additional transceiver module, thereby obviating the need for a separate gateway to the cloud. In an embodiment, communication with the cloud can be achieved by way of a hard-wire interface between the wireless sensor module 10 and an external computer, wherein said external computer is part of the cloud or has the means to communicate with the cloud.

The modularity further allows for including one or more secondary processors. Since not all IoT applications require a secondary processor, including one in each product produced would unnecessarily raise costs and increase energy consumption. By including a secondary processor in certain wireless sensor module 10, the amount of wireless data transmission can be dramatically reduced.

While the present disclosure has been described with reference to an exemplary embodiment, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the appended claims. The right to claim elements and/or sub-combinations that are disclosed herein as other present disclosures in other patent documents is hereby unconditionally reserved.

What is claimed is:

1. A wireless sensor module comprising:
    a primary body;
    a primary processor mounted to said primary body;
    a first plurality of sockets mounted to said primary body and disposed in electrical communication with said primary processor;
    a secondary body releasibly mounted to said primary body through a first socket of said first plurality of sockets;
    a secondary processor mounted to said secondary body, said primary processor and said secondary processor disposed in electrical communication with one another through said first socket and operating asynchronously;
    a first transducer releasibly mounted to said primary body and disposed in electrical communication with said primary processor through a second socket of said first plurality of sockets, said primary processor configured to direct the electrical signals generated by said first transducer to said secondary processor;
    a first wireless transceiver disposed in electrical communication with said primary processor;
    wherein said secondary processor is configured to process the electrical signals generated by said first transducer independently of said primary processor and selectively communicate output to said primary processor; and
    wherein said primary processor is configured to control communications through said first wireless transceiver independently of said secondary processor.

2. The wireless sensor module of claim 1 further comprising:
    a second plurality of sockets mounted to said secondary body and disposed in electrical communication with said secondary processor.

3. The wireless sensor module of claim 2 further comprising:
    a second transducer releasibly mounted to said secondary body and disposed in electrical communication with said secondary processor through a first socket of said second plurality of sockets, whereby electrical signals generated by said second transducer are communicated to said secondary processor.

4. The wireless sensor module of claim 3 wherein said second transducer is further defined as disposed in electrical communication only with said secondary processor.

5. The wireless sensor module of claim 3 wherein:
    said primary processor is further defined as configured to convert the electrical signals received from said first transducer from analog to digital prior to directing the electrical signals generated by said first transducer to said secondary processor; and
    said secondary processor is further defined as configured to perform processing on the digital electrical signals received from said primary processor and on the digital electrical signals received from the second transducer.

6. The wireless sensor module of claim 1 further comprising:
    at least one battery electrically coupled to one of said primary body and said secondary body and configured to provide electrical power required by at least one of said primary processor and said secondary processor.

7. The wireless sensor module of claim 6 wherein said at least one battery exclusively provides electrical power required by said primary processor and by said secondary processor.

8. The wireless sensor module of claim 7 wherein said at least one battery is further defined as directly electrically coupled to said primary body and provides electrical power required by said secondary processor through the interconnection between said primary body and said secondary body.

9. The wireless sensor module of claim 1 wherein said secondary processor is further defined as configured to perform stream processing on the electrical signals generated by said first transducer.

10. The wireless sensor module of claim 9 wherein said primary processor is further defined as configured to convert the electrical signals received from said first transducer from analog to digital prior to directing the electrical signals generated by said first transducer to said secondary processor.

11. The wireless sensor module of claim 9 wherein only said secondary processor of said primary processor and said secondary processor is configured for stream processing.

12. The wireless sensor module of claim 1 further comprising:
    a third transducer releasibly mounted to and disposed in electrical communication with said primary processor through a third socket of said first plurality of sockets, whereby electrical signals generated by said third transducer are communicated to said primary processor.

13. The wireless sensor module of claim 12 wherein electrical signals generated by said third transducer are processed only by said primary processor.

14. The wireless sensor module of claim 1 wherein said first plurality of sockets includes a fourth socket, wherein said primary processor is configured to receive electrical power through said fourth socket.

15. The wireless sensor module of claim 1 further comprising:
    an enclosure defining a cavity sized to receive said a primary body, said primary processor, said first socket, said secondary body, said secondary processor, said first transducer, and at least a portion of said wireless transceiver, said enclosure having an envelope size of less than 30 centimeters in width, 20 centimeters in height, and 20 centimeters in depth.

16. The wireless sensor module of claim 15 wherein said enclosure is further defined as having an envelope size of less than 15 centimeters in width, less than 10 centimeters in height, and less than 10 centimeters in depth.

17. The wireless sensor module of claim 15 further comprising:

at least one battery electrically coupled to one of said primary body and said secondary body and configured to provide electrical power required by at least one of said primary processor and said secondary processor and positioned in said cavity.

18. The wireless sensor module of claim 1 further comprising:
a second wireless transceiver releasibly mounted to said primary body said second wireless transceiver disposed in electrical communication with said primary processor through a third socket of said first plurality of sockets, wherein said second wireless transceiver is controllable by said primary processor.

19. The wireless sensor module of claim 18 wherein the second wireless transceiver is further defined as selectively controllable by said primary processor and by said secondary processor.

20. The wireless sensor module of claim 1 wherein said output of said secondary processor is further defined as a numerical value and said primary processor is further defined as configured to selectively transmit said output of said secondary processor through said first wireless transceiver only in response to said numerical value changing a predetermined amount.

* * * * *